May 14, 1963 M. GREEN ETAL 3,089,620
APPARATUS FOR DISPENSING MEASURED QUANTITIES
OF GRANULAR MATERIALS
Filed May 9, 1960 2 Sheets-Sheet 2
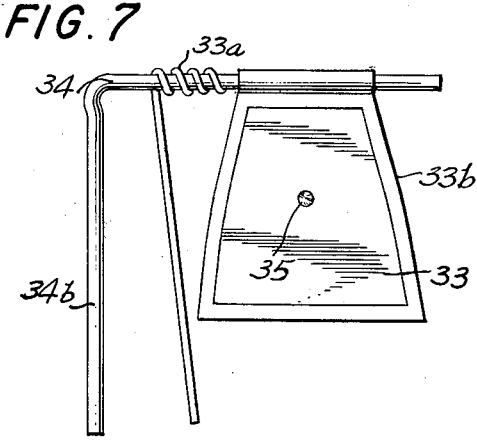
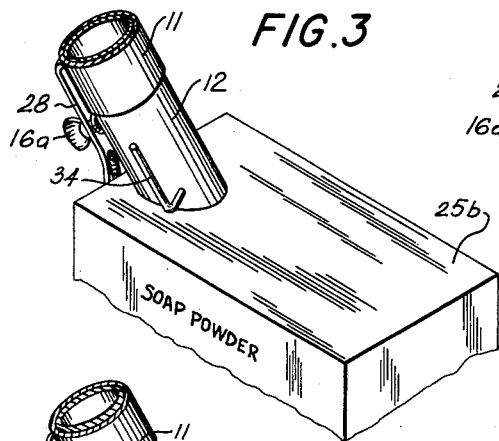
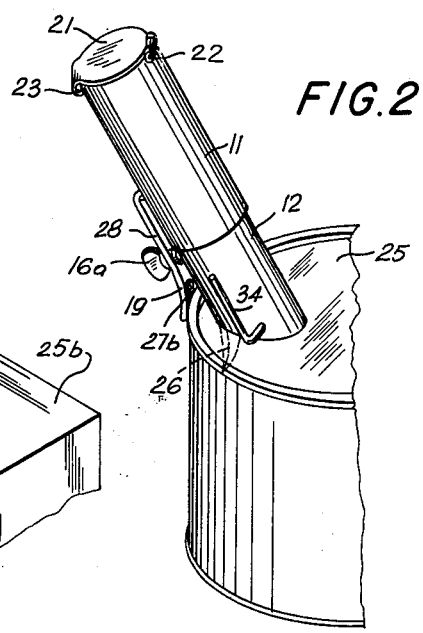
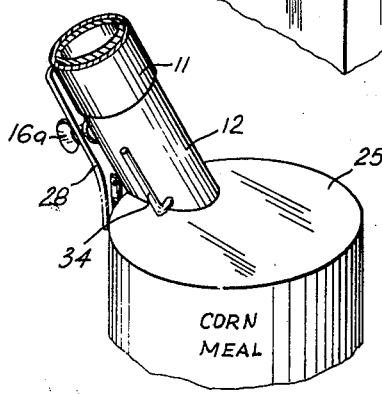
INVENTORS
MARTIN GREEN
FRED FISHBEIN
BY
ATTORNEY United States Patent Office 3,089,620
Patented May 14, 1963

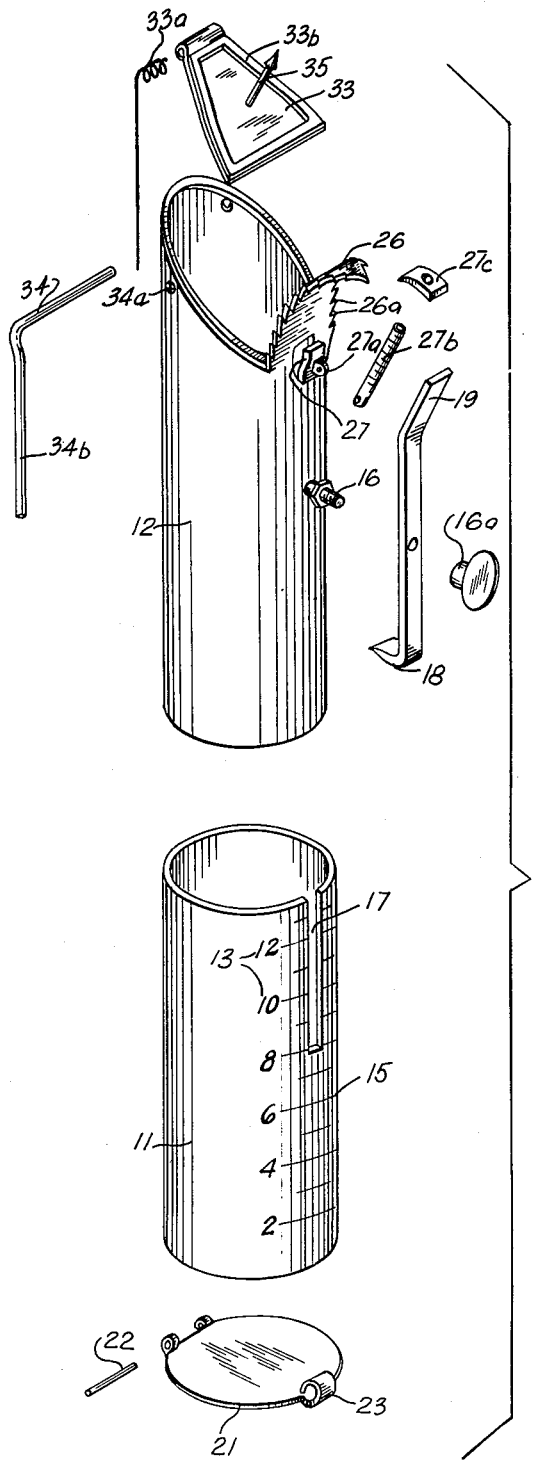
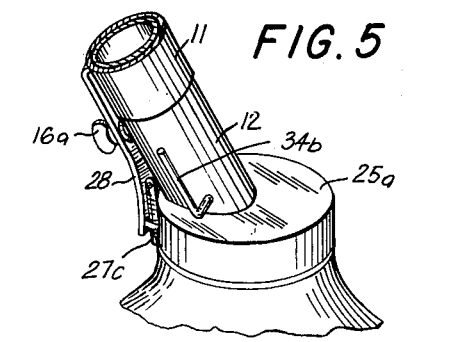
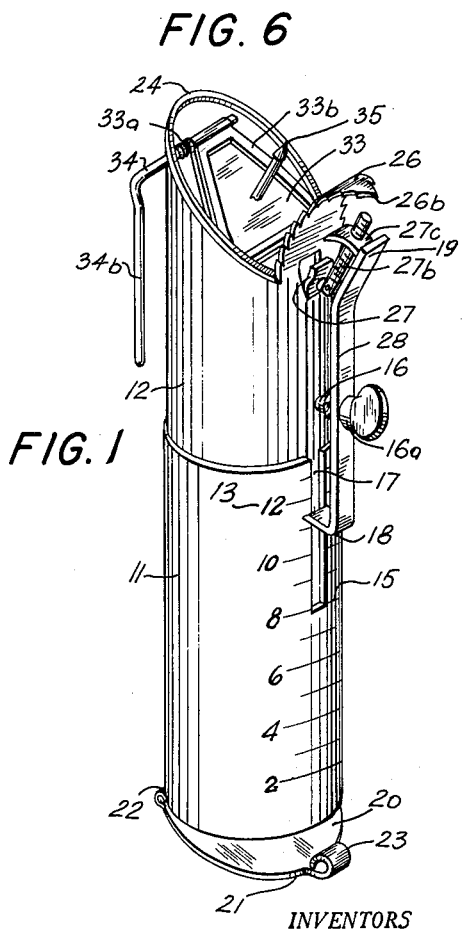
INVENTORS
MARTIN GREEN
FRED FISHBEIN

3,089,620
APPARATUS FOR DISPENSING MEASURED
QUANTITIES OF GRANULAR MATERIALS
Martin Green, 155 Airmount Road, Mahwah, N.J., and
Fred Fishbein, 140 Glen View Road, South Orange,
N.J.
Filed May 9, 1960, Ser. No. 27,547
3 Claims. (Cl. 222—89)

The present invention relates to granular and powder dispensers, and more particularly to a dispenser which will dispense measured quantities of granular material and powder, e.g., coffee.

Since coffee comes both in powdered and granular form, it will serve as an excellent example for an explanation of the present invention which is of course useful in connection with other powdered and granular materials besides coffee. Coffee is a food item in daily use in the American home in both granular or powdered form. In either form, it must be dispensed in measured quantities. Instructions on coffee making usually refer to spoonfuls as the unit measure. It is of course obvious that a spoonful is no accurate measure at all. Not only do spoons differ, but even with the same spoon, the heap in the spoon at one time will differ from a heap in the spoon at another. Furthermore, as coffee is often made early in the morning when people are still half asleep, perhaps half as much coffee ends up on the floor as in the coffee making device. The problems concerning coffee are typical of the problems relating to other similar granular materials or powdered foods.

Although attempts may have been made to provide a proper dispenser for granular and powdered materials, none, as far as we are aware have ever been successful when put into practice on a commercial scale.

It has now been discovered that a dispenser can be provided which can be affixed to powdered or granular material containers, e.g., coffee cans and jars, and with which accurate amounts of the material or ingredient, e.g., coffee can be dispensed directly into a utilization device, i.e. in the case of coffee, a coffee maker or coffee pot.

Thus, it is an object of the present invention to provide means for dispensing powdered or granular materials, particularly coffee.

A further object of the present invention is to provide dispensing means which can readily be affixed to a container, such as a can or jar.

Still another object of the present invention is to provide a dispensing device which can measure quantities of material with great accuracy.

Yet another object of the present invention is to provide a dispenser which can readily cut into a metal container without the user of the dispenser being in danger of being cut.

The invention also contemplates providing a dispenser which will not disturb aroma sealed into a vacuum packed can so that there is no loss of aroma when the device is utilized, the original freshness being retained with each measure dispensed.

It is also within the contemplation of the invention to provide a dispenser useful for square and round containers of metal and cardboard as well as jars with screw tops.

Among the further objects of the present invention is to provide a device for dispensing powdered and granular materials, e.g., coffee which is handy, easy to manufacture, inexpensive, and readily boxed, shipped or handled.

The invention in its broader aspects contemplates a dispenser which comprises, in combination, inner and outer hollow bodies of a pair of slidably adjustable telescoped hollow bodies; graduated quantity markings on one of said hollow bodies denoting quantity in accordance with the telescopic position of said two hollow bodies; a truncated end on one of said hollow bodies providing a shorter and a longer length to said truncated body; container piercing means associated with the shorter length at said truncated end; container grip means associated with said container piercing means; an inner gate at said truncated end including an inner gate opener to allow powdered or granular material to enter said hollow bodies upon the actuation of said opener; a discharge gate, associated with said other one of said hollow bodies at the end thereof not in telescopic engagement with said first mentioned hollow body; and, holding means adapted to hold said truncated end in firm engagement to a container pierced by said container piercing means.

With the foregoing brief explanation in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention. The invention will become apparent, as well as other advantages, from the following description taken in conjunction with the accompanying drawing in which:

FIG. 1 is an exploded perspective view of the dispenser contemplated herein showing details of construction;

FIG. 2 shows a perspective view of the dispenser of FIG. 1 fastened to a can;

FIG. 3 shows a perspective view of the dispenser of FIG. 1 fastened to a square or rectangular box;

FIG. 4 illustrates in perspective how the dispenser of FIG. 1 is fastened to a cardboard box;

FIG. 5 illustrates in perspective how the dispenser is fastened on to a jar of coffee;

FIG. 6 is a perspective view of the assembled device of FIG. 1 showing details of construction; and, FIG. 7 describes in perspective the constructional features of the inner gate used in the dispenser shown in FIGS. 1 and 6.

As shown in the drawing, the dispenser contemplated herein is useful in connection with a variety of granular and powdered materials. However, it is particularly useful as a coffee dispenser.

In accordance with the invention, there is provided a pair of telescopically nested cylinders. The outer cylinders 11 has an inner diameter which is just able to slide over the outer diameter of inner cylinder 12. Outer cylinder 11 has a plurality of graduations 13 which begin at 2 towards one end of the cylinder and continue towards the other end. Advantageously, there are also provided one-half markings in the graduations. These graduations are made in accordance with the predetermined capacity of the cylinders and represent the telescopic position of the two cylinders to obtain the amount of cups of coffee shown by the graduations. The one-half marks permit adjustment for strong or weak coffee. Thus, cylinder 11 is adapted to slide longitudinally over cylinder 12. At each graduation, or for each graduation, there is a stop 15 which may consist of a mere indentation in the graduation. At the free end of cylinder 11, i.e., the end not in telescopic engagement with cylinders 12, there is provided an outlet 20 having a lid 21 pivoted to cylinder 11 by means of a pivot 22 and held in place by a snap holder 23. The free end of inner cylinder 12, i.e., the end not in engagement with outer cylinder 11, is truncated at an angle of somewhere of the order of 45° to the cylindrical axis of the device, the cut being such as to permit the dispenser to engage a coffee can, screw-top jar, or cardboard container, 25, 25a, 25b, as shown in FIGS. 2 to 5. Surrounding this truncated cut is a flange 24 made of rubber or some other similar material so as to make the meeting of the dispenser and the container substantially airtight. The inner cylinder has two lengths, a longer length and a shorter length because of the truncated cut. At the base of the truncated cut, i.e., nearest the shorter side, there is provided a triangular cutter 26, the angular cutting edges 26a extending outwards of the plane of cylinder 12. Cutter 26, at first glance appears to look like an ordinary beer can opener. It is constructed quite differently however. Although generally triangular in shape, it is more of a spherical triangle than a plane triangle. Thus, it is formed in a curved die and the area between the sides of the triangle, i.e., between the triangular cutting edges is curved. The triangular cutting edges 26a are serrated, and the point 26b extends out of the plane of the triangle at an angle of about 35°. Thus, point 26b will form part of a lever and will penetrate a can readily whereas if the triangle were flat, rapid penetration would be difficult in certain cases and considerable force would be required to pierce the container. The cutting edges 26a are serrated because the coffee grains will offer resistance to the penetration of the knife into the can. With serrated edges, the coffee grains slip through the edges and permit the knife to cut through. At the base of triangular cutter 26 is an outwardly extending tongue shaped member 27 adapted to grip the underside of a coffee can to provide leverage for the penetration of cutter 26. To the outer side of member 27 is fastened a swivel stud 27a on which is mounted for swiveling a threaded clamp holder 27b. Screwed on clamp holder 27b is a clamp member 27c. Since the clamp holder 27b is threaded, clamp member 27c can be adjusted so as to engage various sizes of rims, beads, screw lids and covers, etc. For a coffee can, tongue shaped member 27 is used; for other size cans or covers, the clamp member 27c which is adjustable is used for leverage. The appropriate member is placed under the rim or bead of the can or cover providing a pivot for the lever formed of the cutter 26 and the body of the device, i.e., the dispenser as a handle. After cutter 26 has cut into a can or jar and the truncated end is disposed over the opening, it is necessary for said truncated end to be pressed firmly over said opening and kept in place so that the device will extend rigidly from the container, can or jar. To this end, clamp member 27c acts as one jaw of a clamp. And, to hold this clamp jaw tightly clamped, there is provided a resilient retaining arm 28, preferably outwardly curved, and fastened to the underside of inner cylinder 12. Retaining arm 28 is mounted on a threaded member 16 which is affixed to inner cylinder 12. To enable the outer cylinder 11 to slide over the inner cylinder, there is a cut portion 17 on the outer cylinder. This cut is preferably elongated and rectangular shaped. Thus, the combination of the cut and the threaded member 16 also form a sort of guide for the telescoping cylinders. Retaining arm 28 is adjustably held in placed by a wing nut 16a on threaded member 16. When cutter 26 first engages a can, wing nut 16a is loosened and retaining arm 28 is rotated with respect to the longitudinal axis of the cylinders to permit tongue shaped member 27 to grip the underside of the can. After cutter 26 has cut into the can, retaining arm 28 is realigned longitudinally with the cylinders so as to hold grip 27c tightly clamped against the can. Retaining member 28 is adapted to extend not only to the clamp member in one direction, but along the outer cylinder in the other. One end, 18 of retaining member 28 has an inwardly bent shoe so as to engage stop means 15. The other end 19 is outwardly curved so as to form a support for clamp member 27c. Thus, by the combination of clamp member 27c, retaining element 28, threaded member 16, wing nut 16a and shoe 18 engaging stop 15, the dispenser is firmly affixed to the container and the telescopic engagement of the cylinders is set. Preferably the arm of retaining member 28 adapted to act as a clamp jaw support is the shorter arm for leverage purpose.

Disposed over cutter 26 is a gate 33 which may be wedge shaped as illustrated in the drawing. Gate 33 is outwardly biased by a gate spring 33a. Gate 33 and gate spring 33a have a double function. The gate 33 which also advantageously has a rubber flange 33b, releases the coffee from the container and also keeps the opening which cutter 26 has made constantly closed. The rubber flange 33b assists in making this closure air tight. Gate spring 33a, not only keeps gate 33 outwardly biased, but also keeps gate 33 in place. In the manufacture of the device, gate 33 is made separately and, inserted in hinge holes 34a shown in FIG. 1 is hinge pin 34 to which gate 33 is fastened. Spring 33a keeps hinge pin 34 biased against the inner cylinder and in place.

The gate or preferably inner gate 33 may be opened by a lever 34b which is merely an extension at right angles of gate hinge pin 34, and extending along the side of the dispenser.

To facilitate the flow of granular material or powdered material which tends to be sticky, it is advantageous to provide an arrow 35 affixed to inner gate 33 and extending generally at right angles to the plane of the gate in the direction of can or container to be pierced by the cutter 26. The arrow will go into the granular or powdered material such as coffee and, when the gate is opened it will drag some of the coffee along, starting the flow into the dispenser. Thus, by using the dispenser just described, it is possible to obtain in practice precisely measured amounts of granular and powdered materials such as coffee from a coffee can or jar.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A dispenser, comprising in combination, inner and outer hollow bodies of a pair of slidably adjustable telescoped hollow bodies, one of said hollow bodies having a truncated end providing a shorter and longer length thereto; graduated quantity markings on one of said hollow bodies denoting quantity in accordance with the telescopic position of said two hollow bodies; stop means on one of said hollow bodies to hold said hollow bodies at a fixed telescopic position when said stop means are engaged; container piercing means extending from the shorter length of said one hollow body having a truncated end; a clamp member swivelled to and cooperating with said container piercing means to clamp said dispenser against a container; an inner gate at said truncated end including an inner gate opener to allow powdered or granular material to enter said hollow bodies upon actuation of said opener; a discharge gate associated with said other one of said hollow bodies at the end thereof not in telescopic engagement with said first mentioned hollow body; an elongated resilient member having a shoe at one end thereof to engage said stop means, and a curve at the other end thereof to press on said clamp member so that said container is held fast between said container piercing means and said clamp member; and, adjustable holding means fastened on said hollow body not having said stop means, said elongated resilient member being held thereon.

2. A dispenser, comprising in combination, inner and outer hollow cylindrical bodies of a pair of slidably adjustable telescoped hollow cylindrical bodies, one of said hollow bodies having a truncated end providing a shorter and a longer length thereto; graduated quantity markings on one of said bodies denoting quantity in accordance with the telescopic position of said two hollow bodies; container piercing means extending from said shorter length at said truncated end; a tongue shaped grip at the base of said container piercing means; a swivel stud at the outer side of said tongue shaped grip; a threaded clamp holder swivelably connected to said swivel stud at the outer side of said tongue shaped grip; a clamp member adjustably screwed no said swivelably connected threaded clamp holder; an inner gate at said truncated end including an inner gate opener to allow powdered or granular material to enter said bodies upon the actuation of said opener; drag means on said inner gate disposed so as to enter a pierced container at about a right angle to the plane of the gate to drag material into the dispenser upon opening the gate; a discharge gate at the end of said other one of said hollow bodies not in telescopic engagement with said first mentioned body; stop means on the outer of said hollow bodies to hold said hollow bodies at a fixed telescopic position when said stop means are engaged; and, an elongated resilient member having a shoe at the one end thereof to engage said stop means and a curve at the other end thereof to clamp said second grip against a container, fastened to the inner end of said hollow bodies.

3. A dispenser as claimed in claim 2, said inner gate being outwardly biased as well as being biased in place in said truncated opening by the combination of a gate hinge pin, hinged between two points across the longer length of said truncated body, and, a coil spring biasing said gate and said hinge pin, said coil spring being wrapped around said hinge pin.

References Cited in the file of this patent

UNITED STATES PATENTS

| | | |
|---|---|---|
| 288,066 | Kessler | Nov. 6, 1883 |
| 738,737 | Stephan | Sept. 8, 1903 |
| 1,264,960 | Moss | May 7, 1918 |
| 1,360,455 | Shaw | Nov. 30, 1920 |
| 1,551,810 | Draver | Sept. 1, 1925 |
| 2,040,484 | Hathaway | May 12, 1936 |
| 2,102,978 | Slining | Dec. 21, 1937 |
| 2,160,705 | McManus et al. | May 30, 1939 |
| 2,179,280 | Cary | Nov. 7, 1939 |
| 2,350,451 | Embrey | June 6, 1944 |
| 2,588,206 | Clark | Mar. 4, 1952 |
| 2,717,102 | Rives | Sept. 6, 1955 |
| 2,778,532 | Raverty et al. | Jan. 22, 1957 |

FOREIGN PATENTS

| | | |
|---|---|---|
| 456,846 | Germany | Mar. 2, 1928 |
| 494,169 | Germany | Oct. 20, 1938 |